June 29, 1954  J. D. BROWN  2,682,289
SLICER GAUGE PLATE ADJUSTMENT
Filed Dec. 14, 1951  3 Sheets-Sheet 1
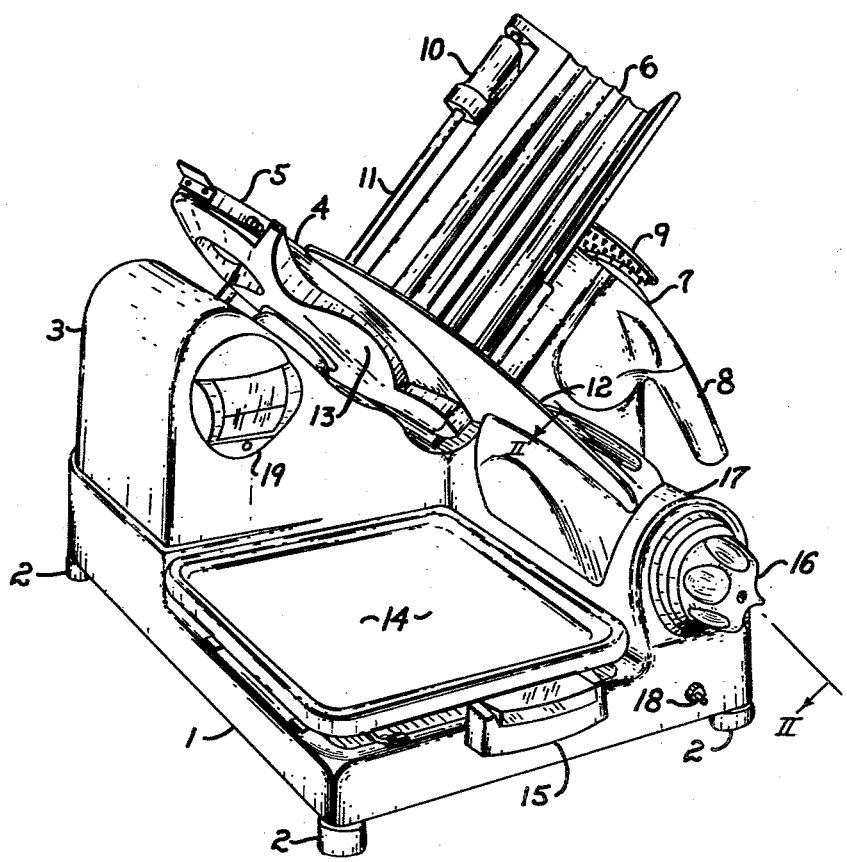
Fig. I
Inventor
JAMES D. BROWN
By
Marshall and Marshall
Attorneys

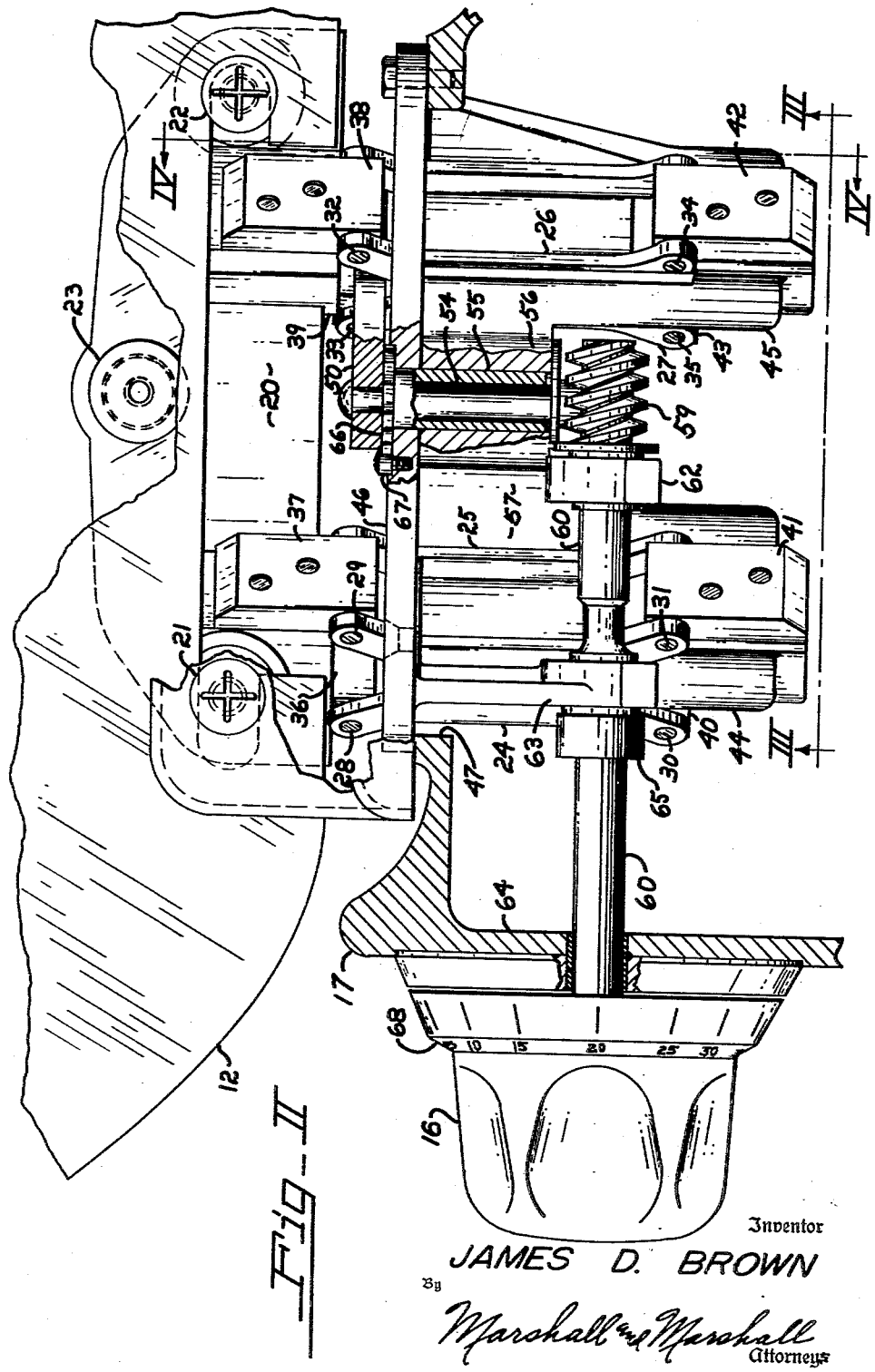

June 29, 1954  J. D. BROWN  2,682,289
SLICER GAUGE PLATE ADJUSTMENT
Filed Dec. 14, 1951  3 Sheets-Sheet 3
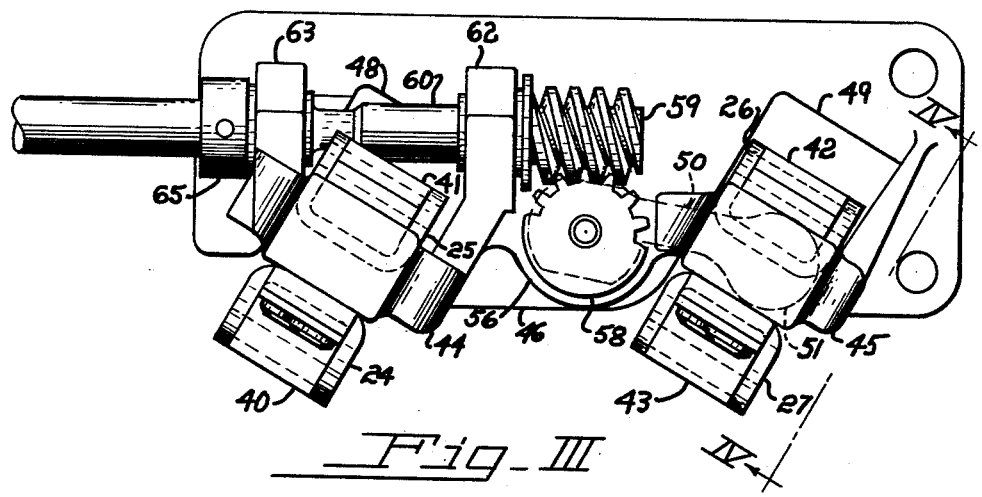
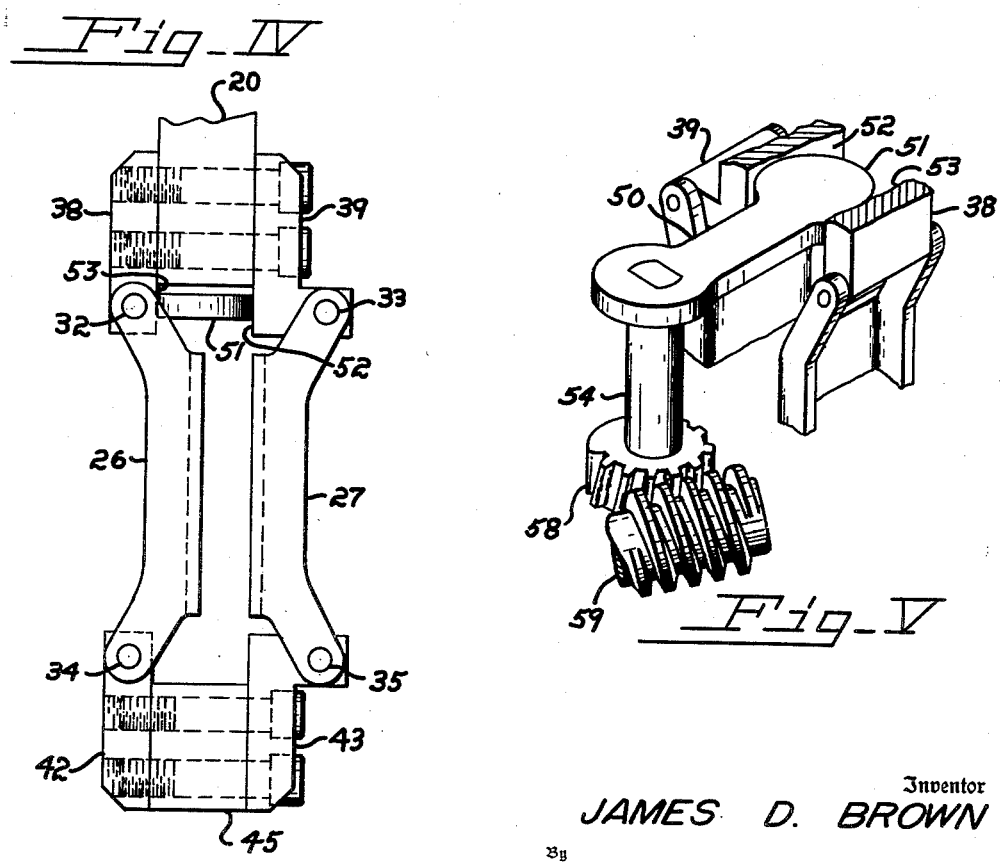
Inventor
JAMES D. BROWN
By
Marshall and Marshall
Attorneys Patented June 29, 1954

2,682,289

UNITED STATES PATENT OFFICE 2,682,289

SLICER GAUGE PLATE ADJUSTMENT

James D. Brown, Toledo, Ohio, assignor to Toledo Scale Company, Toledo, Ohio, a corporation of New Jersey Application December 14, 1951, Serial No. 261,633

4 Claims. (Cl. 146—102)

This invention relates to slicing machines such as are used in retail meat markets and groceries and in particular to improved means for mounting and adjusting the gauge plate of the machine to determine the thickness of the slice which the machine will cut.

In general, slicing machines have some means for supporting the commodity as it is being sliced. These means include a gauge plate the surface of which is parallel both to the path of movement of a carriage that supports the commodity and to the cutting edge of the knife as it engages the commodity. To vary the thickness of the slices cut means are provided for adjusting the position of the gauge plate along a path that is generally perpendicular to the plane of the surface of the plate. In order that additional clearance may be provided between the cutting edge of the knife and the adjacent edge of the gauge plate the gauge plate is also moved parallel to its surface and away from the knife as it is being adjusted for thicker slices.

The previously known gauge plate supporting mechanisms which are located beneath the gauge plate are so bulky that it is difficult to avoid interference between the support mechanism and the commodity carrier, which passes closely adjacent the gauge plate adjusting mechanism, and any slice receiving tray that may be located behind and below the gauge plate. Difficulty is also experienced with previously known gauge plate supporting structures because of the friction that makes it difficult to adjust the plate to vary the thickness of slice.

The principal object of this invention is to provide a compact, yet rigid adjustable mounting for a gauge plate in which the adjusting mechanism itself is self-locking and wherein there is very little friction in the actual gauge plate supporting mechanism.

Another object of the invention is to provide a gauge plate mounting in which sliding motion of one member on another is reduced to a minimum.

A still further object of the invention is to provide a gauge plate mounting in which a plurality of parallel spaced apart members pivotally connected to the frame of the machine and to the gauge plate firmly support the plate in operative relation with the commodity carrier and knife.

More specific objects and advantages are apparent from the following description of a preferred form of the invention.

According to the invention the gauge plate of a slicing machine is adjustably mounted for translation only on a parallelogram linkage suspension having spaced apart parallel members or bars pivotally connected to the frame of the machine and to the gauge plate with the bars or links spaced apart perpendicular to the pivoting axis of each bar a distance sufficient to eliminate rotary movement of the gauge plate about the pivotal connections to the bars. The pivoting axis along which each of the bars or links is joined to the gauge plate or to the frame extends perpendicular to the direction of movement of the gauge plate. The movement of the gauge plate may be either normal to its surface or inclined to such a normal as may be necessary to provide additional clearance between the edge of the gauge plate and the knife to accommodate thick slices of a commodity.

The invention further includes, as part of the adjusting mechanism, a bell crank arm the gauge plate contacting end of which is located at the knife end of the gauge plate supporting mechanism.

A slicing machine embodying a gauge plate supported and adjusted by mechanism constructed according to the invention is illustrated in the accompanying drawings.

In the drawings:

Figure I is a view in perspective of a slicing machine having a gauge plate which is supported and adjusted by mechanism constructed according to the invention.

Figure II is an inclined sectional view, at enlarged scale, taken substantially along the line II—II of Figure I.

Figure III is a bottom view of the gauge plate supporting mechanism as seen from the line III—III of Figure II.

Figure IV is a fragmentary side elevation of a preferred form of parallel link support as employed in the slicing machine.

Figure V is a fragmentary perspective view showing a portion of the gauge plate position adjusting mechanism including a portion of the gauge plate support cooperating therewith.

These specific figures and the accompanying description are intended merely to illustrate the invention but not to limit its scope.

In the specific embodiment illustrated in the drawings the improved gauge plate supporting means is incorporated in an inclined-knife, gravity-feed type of slicing machine. Such a machine may comprise a generally rectangular base 1 resiliently supported on a plurality of rubber feet 2. An inclined-top motor housing 3 erected on the base 1 adjacent one corner encloses a motor (not shown) having drive means extended through the inclined top of the housing 3 to support and drive a generally circular rotary knife 4. The knife 4 is enclosed in a guard 5 that is supported from the inclined top of the motor housing 3.

A generally V or trough-shaped commodity supporting tray 6 is mounted on a reciprocating carriage 7 running on a track formed in the rear portion (as seen in Figure I) of the base 1. The axis of the V-shaped commodity tray 6 (the intersection of the sides of the V-shaped tray) extends generally perpendicular to the plane of the knife so that elongated commodities placed in the commodity tray 6 will be cut squarely as the tray is reciprocated past the cutting edge of the knife. A handle 8 extending from the commodity carriage 7 is provided for the convenience of the operator in moving the commodity carriage 7 back and forth.

Commodities in the tray 6 are driven toward the knife 4 by a pusher plate 9 carried on an arm extending laterally from a sleeve 10 slidably mounted on a guide rod 11 of the commodity tray. As shown in Figure I, the pusher plate 9 has been swung to an inactive position outside the tray. When it is to be used the pusher plate 9 is swung around the rod 11 as an axis and positioned in the V of the commodity tray 6.

The thickness of slices cut from the commodity is controlled by the position of a gauge plate 12, which is laterally adjacent the knife and arranged to support the commodity while the tray 6 is at that end of its path of movement remote from the knife 4. As the machine is operated a commodity in the V-shaped tray 6 slides down the tray until it is supported by the gauge plate 12. As the tray 6 is moved past the cutting edge of the knife 4 a slice is cut from the commodity and the cut face of the commodity is then supported on that portion of the guard 5 overlying the central area of the knife 4. As the carriage 7 and tray 6 is returned to its first position adjacent the gauge plate 12 the commodity slides down the tray 6 so that it is in position for cutting the next slice.

The slices cut from the commodity pass through a throat formed between the edge of the knife 4 and the adjacent edge of the gauge plate 12. The cut slices are deflected downwardly by a wedged-shaped portion 13 of the guard 5 so that they drop onto a receiving tray 14 which may be a simple pan or removable tray or which, in the embodiment shown, is a load receiver of a weighing scale having an indicator housing 15 containing a chart with which a pointer cooperates to indicate the approximate weight of the sliced material.

The thickness of the slices cut by the knife 4 from a commodity carried in the tray 6 is controlled by the position of the gauge plate 12 relative to the cutting edge of the knife 4. The operator by rotating a control knob 16 extending laterally from a low housing 17 erected on the corner of the base 1 diagonally opposite the motor housing 3 moves the gauge plate 12 away from the plane of the knife 4 to whatever extent is required to produce the desired thickness of slice.

The motor driving the knife 4 is controlled by a switch 18 mounted in a wall of the base 1 directly below the control knob 16. In addition to controlling the motor the switch 18 also controls a light source mounted in a light source housing 19 on that wall of a motor housing 3 which faces the commodity receiving tray 14. The light in the light source housing 19 serves both as a pilot light and to illuminate the slice receiving tray 14.

Supporting mechanism for the gauge plate 12 is shown at enlarged scale and in detail in Figures II, III and V. Referring to Figure II the gauge plate 12 is secured to a gauge plate carrier 20 by means of adjustable studs 21, 22 and 23 which provide for adjustment of the gauge plate 12 lengthwise of the carrier 20 (to adjust the clearance between the plate and knife) and for tilting the gauge plate 12 with respect to the carrier 20. The tilting adjustment permits the gauge plate 12 to be aligned with the path of the commodity carrier 6 and with the adjacent edge of the knife 4. The gauge plate carrier 20 is itself carried on a parallelogram linkage comprising a plurality of parallel, spaced-apart members or links 24, 25, 26 and 27. The links 24, 25, 26 and 27 are each channel shaped with the sides of the channels extended longitudinally of the links to engage hinge pins 28, 29, 30, 31, 32, 33, 34 and 35. The hinge pins 28 and 29 at the upper ends of the links or parallel members 24 and 25 are mounted in depending portions or blocks 36 and 37 located at one end of the gauge plate carrier 20 while the hinge pins 32 and 33 in the upper ends of the links 26 and 27 are similarly mounted in depending lugs or brackets 38 and 39 integral with or attached to the right end of the carrier 20 as seen in Figure II. The lower ends of the links 24, 25, 26 and 27 are connected by the hinge pins 30, 31, 34 and 35 to laterally projecting lugs or blocks 40, 41, 42 and 43 extending laterally from the lower ends of U-shaped posts or brackets 44 and 45 forming part of a closure plate 46 serving as a cover for an opening 47 in the upper portion of the low housing 17. The plate 46 is cut away from one side to leave U-shaped openings 48 and 49 (Figure III) which provide clearance space for the upper ends of the links 24 to 27 inclusive.

All of the hinge pins 28 to 35 inclusive are parallel to each other and the links 24 to 27 inclusive are of equal lengths and are each parallel to the others so that they function as a parallelogram linkage so that the gauge plate carrier 20 may be moved transversely to its length and to the links without any rotation about its longitudinal or transverse axes. Thus the gauge plate is held parallel to its original position as it is adjusted back and forth to vary the thickness of the slices being cut. As may be seen from Figures II and III the hinge pins 28 to 35 inclusive are not parallel to the plane of the gauge plate 12 but rather are inclined approximately thirty degrees thereto. This inclination of the hinge pins is in a direction such that the gauge plate moves radially away from the edge of the knife 4 as it is moved to increase the thickness of the slice. The radial movement of the gauge plate provides the increased throat space between the gauge plate and knife required for thick slices.

The position of the gauge plate carrier 20 along the path of movement determined by the parallel links or members 24 to 27 inclusive is controlled by an arm 50 having a generally circular enlarged portion 51 engaged between faces 52 and 53 of the depending lugs or brackets 38 and 39. The enlarged circular portion is generally cylindrical to provide line contact with the faces 52 and 53 to minimize wear of these surfaces.

The adjusting arm 50 is nonrotatably secured to the upper end of a shaft 54 journaled in an eccentric bushing 55 rotatably mounted in an enlarged section 56 of a web 57 (Figure II) connecting the U-shaped brackets or posts 44 and 45. A worm wheel 58 nonrotatably mounted on the bottom end of the shaft 54 meshes with and is rotatably positioned by a double thread worm 59 mounted on the end of a control shaft 60 journaled in laterally extending arms 62 and 63 of the U-shaped support bracket 44. The control shaft 60 extends through an end wall 64 of the housing 17 to receive the adjusting knob 16. End play of the shaft 60 is prevented by engagement of the worm 59 with one face of the arm 62 and by engagement of one face of a collar 65 with the adjacent face of the arm 63. Rotation of the control knob 16 by turning the worm 59 meshed with the wheel 58 rotates the arm 50 and moves the gauge plate carrier 20 relative to the frame of the slicing machine. The eccentric bushing 55 is provided with an integral toothed flange 66 which is engaged by a lock screw 67 to hold the bushing against rotation. With the screw 67 removed the bushing is rotated to secure proper meshing of the thread of the worm 59 with teeth of the worm wheel 58.

To aid in repeating the settings of the gauge plate graduations may be stamped or otherwise imprinted on an inclined face 68 of the control knob 16 to indicate the position of the gauge plate and the thickness of the slices that will be cut for that particular setting.

It is to be noted that this parallel link support for the gauge plate is extremely compact as may be seen in Figure III and that practically all sliding of one member upon another is eliminated so that free movement of the plate is assured. This compactness is important in that it avoids all interference with the track for the commodity carriage 7 within and along one side of the housing 17 and with the slice receiving tray on the other side of the housing 17. The movement of the gauge plate 12 is limited and controlled by the adjusting means including the adjusting knob 16 and the mechanism operatively connecting it to the arm 50 the end of which engages the depending lugs or brackets 38 and 39. It should also be noted that, even though the hinged arrangement provides a firm pivotal connection, the circular end 51 of the arm 50 engages those lugs or brackets 38 and 39 which are more nearly beneath the cutting edge of the knife 4. Thus any play or freedom in the pivotal or hinged connections, while it may allow a light rotation of the gauge plate carrier 20 and the gauge plate 12 mounted thereon will not produce any substantial error in the thickness of the slices being cut.

Various modifications of the structure and rearrangement and combination of the links or members 24 to 27 inclusive may be made without departing from the spirit and scope of the invention.

Having described the invention, I claim:

1. In a slicing machine having a base, a knife, and a reciprocable commodity carrier for carrying material to be sliced past the cutting edge of the knife, in combination, a portion of the base extending along that portion of the path of the commodity carrier that is remote from the knife, a gauge plate carrier, a gauge plate adjustably attached to the carrier which plate has a surface that is laterally adjacent and generally parallel to the cutting edge of the knife and the path of movement of the commodity carrier, and means for supporting the gauge plate carrier for adjustment in a direction generally perpendicular to its surface, said means comprising at least one pair of parallel spaced-apart members extending downwardly in a direction generally parallel to the surface of the gauge plate, hinge means for connecting each of the members to said base portion and to the portion of the gauge plate carrier adjacent the base, the axes of said hinge means being parallel to each other and equally spaced whereby said members form the sides of a parallelogram to prevent tipping of the gauge plate during adjustment thereof, and manually controlled adjusting means mounted on the base and including a knob and a bell crank arm extending generally parallel to the surface of the gauge plate and having a pivotal and sliding connection with the gauge plate carrier which connection converts pivotal movement of the bell crank arm into translation of the gauge plate carrier for adjusting the gauge plate perpendicular to the plane of the knife in substantially equal increments for equal angular movements of the knob.

2. In a slicing machine having a base, a knife, and a commodity carrier adapted to present material to be sliced to the cutting edge of the knife, in combination, a base portion extending along the path of the commodity carrier, a gauge plate above said extended portion which gauge plate extends from the knife parallel to the path of the commodity carrier, a plurality of parallel spaced-apart links pivotally attached to the portion of the gauge plate adjacent the base portion and to the base portion for supporting the gauge plate, the links being of generally equal length and extending generally parallel to the gauge plate to form a parallelogram linkage to resist rotation of the gauge plate, and adjusting means mounted on the base and including a manually controlled member and a bell crank arm having a rounded sliding portion adapted to convert pivotal movement of the bell crank arm into translation of the gauge plate for adjusting the gauge plate perpendicular to the plane of the knife in substantially equal increments for equal angular movements of the manually controlled member.

3. In a slicing machine having a base, a knife, and a commodity carrier adapted to present material to be sliced to the cutting edge of the knife, in combination, a base portion extending along the path of the commodity carrier, a gauge plate above said portion and extending from the knife parallel to the path of the commodity carrier, a plurality of links each pivotally connected to the portion of the gauge plate adjacent the base portion and to the base portion, each link being of substantial width along its pivotal connections whereby gauge plate movement parallel to the width of the links is strongly resisted, and adjusting means in said base portion including a knob and a bell crank arm extending generally parallel to the surface of the gauge plate and having a generally circular enlarged portion engaged between generally parallel faces fixed to the gauge plate to form a sliding connection which converts pivotal movement of the bell crank arm into translation of the gauge plate for adjusting the gauge plate perpendicular to the plane of the knife in substantially equal increments for equal angular movements of the knob.

4. In a slicing machine having a base, a knife, and a commodity carrier adapted to present material to be sliced to the cutting edge of the knife, in combination, a base portion extending along the path of the commodity carrier, a gauge plate extending from the knife and parallel to the path of the carrier, a bracket mounted on said base portion and below said gauge plate, said bracket having a pair of downwardly extending supports, a plurality of links each extending from the gauge plate to the lower part of said supports, hinge means connecting each of the links to the gauge plate and the supports, said links being parallel to each other and spaced-apart to support the gauge plate against rotation, and adjusting means mounted on said bracket and including a manually controller member and an arm extending generally parallel to the surface of the gauge plate and having an enlarged portion adapted by rocking and sliding movement to convert pivotal movement of the arm into translation of the gauge plate for adjusting the gauge plate perpendicular to the plane of the knife in substantially equal increments for equal angular movements of the manually controlled member.

References Cited in the file of this patent

UNITED STATES PATENTS

| Number | Name | Date |
| --- | --- | --- |
| 1,652,132 | Donald | Dec. 6, 1927 |
| 1,739,490 | Campbell | Dec. 10, 1929 |
| 2,305,177 | Litty | Dec. 15, 1942 |
| 2,598,740 | Zimmerman | June 3, 1952 |